UNITED STATES PATENT OFFICE.

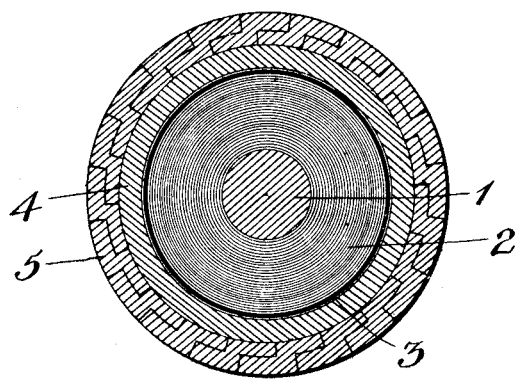
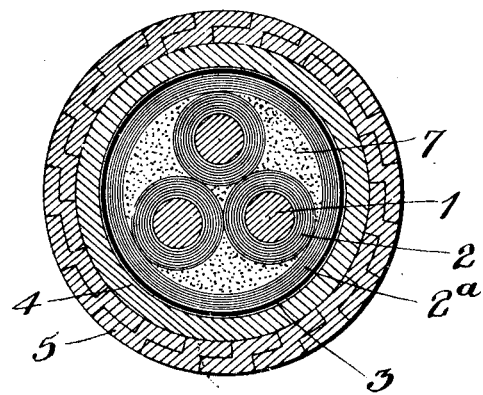
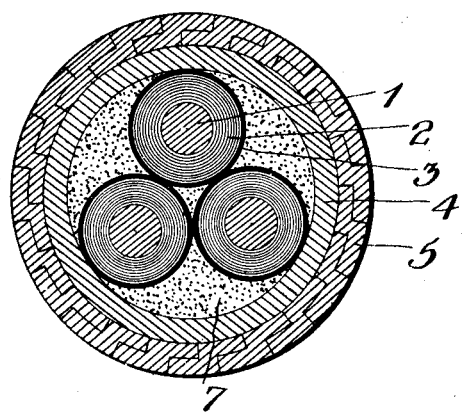
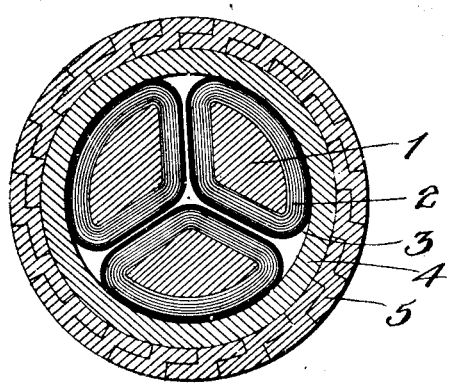
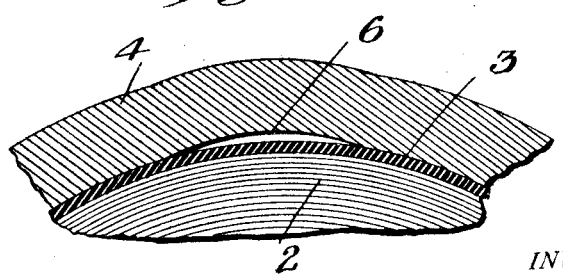

MARTIN HOCHSTADTER, OF HARRISBURG, PENNSYLVANIA.

ELECTRICAL CONDUCTOR.

1,199,789.

Specification of Letters Patent.

Patented Oct. 3, 1916.

Application filed March 27, 1913. Serial No. 757,187.

*To all whom it may concern:*

Be it known that I, MARTIN HOCHSTADTER, a subject of the German Empire, residing at Harrisburg, in the county of Dauphin and State of Pennsylvania, have invented new and useful Improvements in Electrical Conductors, of which the following is a specification.

This invention relates to improvements in electric conductors, and more particularly to high-tension cables for electric power-transmission.

It is the object of this invention to provide a cable adapted to be laid underground that will be free of internal sparking and glowing, so as to be safe for use in very high-tension power-transmission.

That such an improvement is necessary may be realized from the fact, that, as yet, underground power-transmission is used only up to a voltage of about 25,000 volts, while electrical machinery and overhead transmission are worked as high as 130,000 volts. Almost invariably the underground cable is a lead-sheathed cable, and it is because underground service practically always requires the use of lead-sheathed cables that the difficulty to which my invention is directed is particularly applicable to underground cables. In making installation of a lead-sheathed cable it is necessary to subject the cable to greater or less bending, and such bending incident to installation tends to a displacement of the insulation and the formation of air spaces within the insulation itself, between the insulation and the lead which surrounds it, and between the insulation and the conductor which it surrounds. The sheath of the lead-sheathed cable is necessarily of substantial thickness, the lead itself is practically incompressible and inelastic, and while easily deformed, it is practically impossible when once it has been bent to bring it back again to its original shape making contact at all points with the insulation which it surrounds. Displacement of insulation and the formation of air spaces mean the creation of places where sparking and glowing may occur to effect the ultimate destruction of the cable.

It must be admitted that the compound paper insulation which is used almost exclusively in the manufacture of high tension cables has already been made an almost perfect dielectric. The unsheathed single cored cable, therefore, is such a structure that, if the lead sheath could be applied and maintained as an envelop of perfect symmetry and closeness of fit, all the requirements of a structurally perfect condenser would be had. The troubles which arise with lead-sheathed cables as now made when used for high voltages are due to two faults in their construction. First, the usual way of applying the lead sheath; and, second, especially for polyphase power cables, the filling of the spaces between the cores with an inferior insulating material, usually jute.

The lead sheath as an external mechanical protecting cover must be of considerable thickness and however closely it be pressed upon the cable body, the limitations upon manufacture are such that as a matter of fact it fits upon the cable body rather loosely. Indeed, it is thought desirable by some engineers, particularly in foreign countries, to consciously provide for a certain looseness of fit in this regard in order to facilitate bending. In the cables of usual construction transverse plaits and grooves are during manufacture unavoidably produced on the inner surface of the lead cover and the outer surface of the otherwise nude cable, the size of which depends upon different circumstances, for instance, the thickness of the insulating material, the pressure used in shaping it, the pressure used in applying the iron tapes of the armor (when employed), the thickness of the layer of jute between the lead sheath and the armor, etc.

On account of conditions of manufacture just explained, and the consequent structural deformation when once the cable has been installed under ordinary service conditions which involves its bending, the lead sheath cannot practically fulfil to perfection its second function additional to its function as a protecting cover — that, namely, of an outside electrode.

Free spaces are liable to occur between the lead sheath and the surface of the insulating material, the effect of which when present is especially bad for very high tension transmission. The lack of good contact between the insulation and the sheath produces sparking and glowing in such spaces, the result of which is soon seen in the creation of burnt spots, and leads to shortening the life of such cables, when used at a pressure exceeding a certain critical voltage. It is therefore seen that the lead sheath while meeting the primary requirement for which it is intended, namely, to serve as a mechanically protecting cover, cannot adequately meet the second requirement, that of an outside electrode.

In accordance with this invention, compounded paper insulation is preferably placed about the core, and the lead sheath is used only as a mechanical protecting cover. The electrical field of the core (which otherwise would be limited by the lead sheath) is limited to the outer surface of the insulation by the presence at that point of a separate and closely adhering thin layer of electrically conducting material. This metallizing of the surface of the active insulation is conveniently accomplished when the outmost layer of the compounded paper insulation is being applied, thereby forming an electrically conducting cylindrical layer as a substantially integral part of the insulation. When the metallic layer is not in direct contact with the lead sheath, both layer and sheath should be grounded. If the lead sheath is grounded, then the metallic layer will form an electrode adapted to carry the same potential as the lead sheath.

The copper core, the insulating material, and the metallized surface of the same form a structurally perfect condenser, the perfection being preserved even though the cable be subjected to bending, and the cable will be free from sparking and glowing.

The practice of carrying out of this invention may be accomplished in different ways: For instance, the metallic layer can be formed of tapes of tinfoil or of very fine wire netting, the thinner the layer the better. It is advantageous to apply this metallic tape together with and inserted between the outmost wrappings of the paper as they are laid on; it may however, itself form the outmost layer, if means are provided to secure its perfect adherence to the insulation. Moreover, it is possible to so prepare the outer wrappings of the insulation beforehand, as to make them in themselves electrically conducting.

In making underground installation, care should be taken that the thin metallic layer of the nature and structure indicated shall not constitute an isolated and continuous conductor for long distances, for it is not designed to carry heavy currents, such, for instance, as short-circuit currents. At the junction boxes, therefore, the electric continuity of the layer should be interrupted, or electric connection should be made between the layer and the cable sheath.

A single-cored cable manufactured in accordance with the above invention, represents structurally a practically perfect condenser. As regards polyphase cables, the difficulties attendant upon the transmission of high-tension currents are (in the absence of my invention) very great; for in the making up of the cables the individual cores, when insulated, are bunched, the interstices filled with jute in such manner as to build out to cylindrical form; upon the body so built out with jute, other insulation (usually paper wrappings) is applied; and upon this cylindrical body the sheath is applied. In this relatively coarse filling, spaces are unavoidable, where destructive sparking and glowing will begin. But the difficulties of this character in the use of polyphase cables are greatest at the ends of each cable section, that is in the junction boxes or joints, where the conductors of the cable have to be spread in order to make connections. The space around and about the several conductors in the junction-box, shows a very intensive electrical discharge at voltages above a certain limit. This condition, existing where joints are required, as in junction boxes and in terminals, is the cause of a great difficulty for the engineer.

The disturbance in the electrical field at the places of joining as described above, is an unavoidable consequence of the present construction of these cables, because in them the internal polyphase electrical field is spread all over the non-homogeneous cross-section, including the jute. It is obvious that the electrical field changes in form suddenly at the joints where the covers and the jute are removed and the conductors spread; and that the electric field which, in the sound cable passes through the jute, now passes through air. Conditions are disturbed, electrical tension is localized and intensified, and glowing and breaking down of insulation follows.

A phenomenon similar to the above occurs inside of the polyphase cables. On account of the non-homogeneous cross-section and the electrical tangential strain produced on the surfaces between the close wrapped or primary insulation and the jute, discharges are brought about at pressures above a certain limit. The effect of these discharges is similar to that described above. In the usual polyphase cables, the internal discharge tends to make the outer surfaces of the separately insulated conductors equipotential, the actual potential tending to become that of the neutral or ground, thus rendering the insulation applied over the separately insulated conductors free from electrical strain and therefore inactive, and therefore futile.

As a consequence of the faults of the present construction of polyphase cables, in many cases single-cored cables have heretofore been preferred for very high working pressures.

Since the jute and outside insulation are by the above mentioned troubles rendered ineffective throughout the usual polyphase cable, the faults of the cable are to be overcome by avoiding all electrical strain in these parts by adequate construction.

According to the present invention, this aim also is reached in the most simple and thorough way, by applying an outer electrode, as described above, to the surface of the insulation of each individual conductor. The method of inserting, the effect of, and all details of, this electrode are in accordance with the above-given explanations.

Such a cable now represents electrically three single-cored cables inclosed in one common lead sheath; and the electrical strain is, therefore, the same for each conductor as for a single-cored cable. Therefore, the effect of such a construction is such that a polyphase cable will be as reliable as a single-cored cable. At the same time, it is evident that all the difficulties which now exist at the joints and terminals of polyphase cables will be eliminated by the new construction.

Other advantages afforded by this new construction of polyphase cables are as follows: The common outside insulating material surrounding the bunched conductors which is not active and which is called the belt insulation may be replaced by a cheap non-impregnated textile, or, may be omitted entirely. Finally, by using conductors of sector form, the jute or filling material might also be dispensed with. This latter construction is very likely to be the cheapest and most adaptable for such underground cables.

While the preferred forms of this invention are illustrated upon the accompanying sheet of drawing, yet it is to be understood that minor detail changes may be made without departing from the scope thereof.

Figure 1 is a view in transverse section taken through a single-cored cable constructed in accordance with this invention. Fig. 2 is a similar view through one form of a three-cored cable illustrating one application of this invention thereto. Fig. 3 is a view similar to Fig. 2, illustrating another form of the application of this invention. Fig. 4 is a similar view illustrating the application of this invention to sector-shaped cores and insulation. Fig. 5 is a fragmentary view in transverse section, illustrating a condition under which the advantage of my invention is realized.

Fig. 1 represents a single-cored cable manufactured in accordance with this invention and is structurally a substantially perfect condenser. The copper conducting core 1 is surrounded by spirally wound compounded paper insulation 2. This layer of insulation will, as will be understood, be of such depth as is suited to the intensity of the electrical field produced by the core of the size in hand when carrying a current of intended voltage. The electrically conducting film or surface 3 of the tinfoil or wire tape is preferably applied to the outer surface of the compounded paper insulation by winding a strip of the same between the spirals of the compounded paper insulation as the outermost portion is being laid on. This metallic integument, so applied, will adhere tightly to the compact insulation and form a substantially integral outer surface therefor. The lead sheathing 4 is preferably provided with a protecting armor 5 of any recognized form. The bending of the cable will in no way disturb the compactness of the compounded paper insulation about the core and, as the metallic surface thereabout forms a substantial integral part thereof, no air spaces will be formed in the insulation, and the contact between the metallic surface and insulation will remain perfect. Therefore, as the electric field about the copper core is limited by the metallic film to the outer surface of the insulation, such air spaces as 6 in Fig. 5 formed by imperfect contact between the outer lead sheath 4 and outer surface of the insulation 2 (otherwise under electrical tension, and places of sparking and glowing) are without effect, to injure the cable.

Fig. 2 illustrates a three-cored cable in which each conducting core 1 is surrounded by compounded paper insulation 2 and the three insulated cores surrounded by cylindrical compounded paper insulation 2ª provided on its outer surface with the electrical conducting film or surface 3, as described in connection with Fig. 1. The spaces between the core insulation 2 and the surrounding cylindrical insulation 2ª are filled with loosely packed material 7, such as jute.

Fig. 3 illustrates a three-cored cable particularly adapted for polyphase high-tension transmission, in which each core is provided with the compounded paper insulation and surrounding metallic surface, similar to that described in connection with Fig. 1. The lead sheathing and armor are placed about the three cores and the spaces therebetween filled with loosely packed material such as jute.

Fig. 4 illustrates a modified form of the construction of Fig. 3, in which the filling of insulating material between the cores and lead sheath is dispensed with by forming each core and surrounding compact insulation in sector shape.

I have described as alternative forms of the metallic integument, tinfoil and fine wire netting. I do not intend to limit my invention to either or to both of these forms of metal layer, but I mention them as instances of proper nature and character and easy of application. It is desirable that this metallic integument, while substantially continuous, shall still be permeable by insulating compounds in fluid form, with which the paper insulation may advantageously be saturated after it has been applied. It is apparent that wire netting when used lends itself to this desirable end. Other expedients may be resorted to, permitting liquid insulation to penetrate the insulation beneath the metallic integument.

By the phrase "a source of high tension current", used in certain of the ensuing claims, I mean to characterize a generator and transmitter, or equivalent apparatus, for producing a current of a potential of 10,000 volts and upward, and by the phrases "high-tension cable" and "high-tension circuit" I mean to characterize cables and circuits capable of carrying in economic manner currents having potentials of 10,000 volts and upward.

I claim as my invention:

1. A high-tension cable free from sparking and glowing including in its structure a conducting core, a surrounding body of insulating material, a thin layer of conducting material applied to the said body of insulating material to the exclusion of air pockets, the continuity of such layer as an isolated conductor being destroyed at intervals.

2. A high-tension cable free from sparking and glowing including in its structure a conducting core, a spirally wound surrounding body of laminate insulating material and a thin layer of conducting material intercalated in the outer turns of said spirally wound surrounding body, the continuity of such intercalated layer as an isolated conductor being destroyed at intervals.

3. A high-tension cable free from sparking and glowing including in its structure a conducting core, a surrounding body of insulating material, a thin layer of conducting material applied to the said body of insulating material to the exclusion of air pockets, a wrapping of securing material surrounding said thin layer of conducting material, the continuity of the said thin layer as an isolated conductor being destroyed at intervals.

MARTIN HOCHSTADTER.

Witnesses:
ALFRED G. WORMSER,
LANGDON MOORE.